(12) United States Patent
Silk et al.

(10) Patent No.: US 8,877,285 B2
(45) Date of Patent: Nov. 4, 2014

(54) PROCESS FOR REPAIRING A CYLINDER RUNNING SURFACE BY MEANS OF PLASMA SPRAYING PROCESSES

(71) Applicant: Ford Global Technologies, LLC, Dearborn, MI (US)

(72) Inventors: Mark Robert Silk, Pulheim (DE); Leander Schramm, Remda-Teichel OT Teichroeda (DE); Wolfgang Puetz, Cologne (DE); Clemens Maria Verpoort, Monheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/681,674

(22) Filed: Nov. 20, 2012

(65) Prior Publication Data

US 2013/0129939 A1 May 23, 2013

(30) Foreign Application Priority Data

Nov. 22, 2011 (DE) .......................... 10 2011 086 803

(51) Int. Cl.

| | |
|---|---|
| C23C 16/00 | (2006.01) |
| C23C 4/12 | (2006.01) |
| B05D 5/00 | (2006.01) |
| B23P 6/02 | (2006.01) |
| C23C 4/02 | (2006.01) |
| C23C 4/18 | (2006.01) |

(52) U.S. Cl.
CPC ................ *B05D 5/005* (2013.01); *C23C 4/127* (2013.01); *C23C 4/125* (2013.01); *B23P 6/02* (2013.01); *C23C 4/02* (2013.01); *C23C 4/18* (2013.01)
USPC ...................................... 427/140; 123/195 R

(58) Field of Classification Search
None
See application file for complete search history.

(56) References Cited

U.S. PATENT DOCUMENTS

| | | |
|---|---|---|
| 3,031,330 A | 4/1962 | Hornick et al. |
| 3,114,960 A | 12/1963 | Einaudi |

(Continued)

FOREIGN PATENT DOCUMENTS

| | | |
|---|---|---|
| DE | 4411296 A1 | 7/1995 |
| DE | 19508687 | 10/1995 |

(Continued)

OTHER PUBLICATIONS

European Patent Office, European Search Report for the corresponding European Patent Application No. 12192730.5-1353 mailed Feb. 21, 2013.

(Continued)

*Primary Examiner* — Joseph Miller, Jr.
(74) *Attorney, Agent, or Firm* — Damian Porcari; Brooks Kushman P.C.

(57) ABSTRACT

A method of repairing an inner surface of a cylinder liner housed in an engine block. Material is removed from the inner surface to produce a reduced-thickness region, the reduced-thickness region extending axially relative to the cylinder and stopping short of an end of the liner to leave a region of original diameter between the reduced thickness region and the end of the liner. The surface the reduced-thickness region is then roughened, for example by hammer brushing. A plasma coating is applied to the reduced-thickness region and to at least a portion of the region of original diameter. The coating is then finish-machined to produce a uniform internal diameter equal to an original internal diameter of the region of original diameter prior to the application of the coating.

17 Claims, 3 Drawing Sheets

(56) References Cited

U.S. PATENT DOCUMENTS

| | | | |
|---|---|---|---|
| 3,325,496 | A | 6/1967 | Haracz |
| 3,833,321 | A | 9/1974 | Telang et al. |
| 4,324,017 | A | 4/1982 | Viehe |
| 4,646,479 | A | 3/1987 | Walker et al. |
| 4,967,458 | A * | 11/1990 | Rosenberg et al. ...... 29/888.011 |
| 5,050,547 | A | 9/1991 | Takahashi |
| 5,107,967 | A | 4/1992 | Fujita et al. |
| 5,194,304 | A | 3/1993 | McCune, Jr. et al. |
| 5,212,738 | A | 5/1993 | Chande et al. |
| 5,239,955 | A | 8/1993 | Rao et al. |
| 5,332,422 | A | 7/1994 | Rao |
| 5,363,821 | A | 11/1994 | Rao et al. |
| 5,380,564 | A | 1/1995 | VanKuiken, Jr. et al. |
| 5,466,906 | A | 11/1995 | McCune et al. |
| 5,480,497 | A | 1/1996 | Zaluzec et al. |
| 5,481,084 | A | 1/1996 | Patrick et al. |
| 5,622,753 | A | 4/1997 | Shepley et al. |
| 5,648,122 | A | 7/1997 | Rao et al. |
| 5,691,004 | A | 11/1997 | Palazzolo et al. |
| 5,820,938 | A | 10/1998 | Pank et al. |
| 5,922,412 | A | 7/1999 | Baughman et al. |
| 5,931,038 | A | 8/1999 | Higashi |
| 5,958,520 | A | 9/1999 | Cook et al. |
| 5,958,521 | A | 9/1999 | Zaluzec et al. |
| 5,997,286 | A | 12/1999 | Hemsath et al. |
| 6,328,026 | B1 | 12/2001 | Wang et al. |
| 6,395,090 | B1 | 5/2002 | Shepley et al. |
| 6,441,619 | B1 | 8/2002 | Araki et al. |
| 6,589,605 | B2 | 7/2003 | Shepley et al. |
| 6,622,685 | B2 | 9/2003 | Takahashi et al. |
| 6,856,866 | B2 | 2/2005 | Nakao |
| 6,863,931 | B2 | 3/2005 | Someno et al. |
| 6,914,210 | B2 | 7/2005 | Grossklaus, Jr. et al. |
| 7,089,662 | B2 | 8/2006 | Izquierdo et al. |
| 7,165,430 | B2 | 1/2007 | Weidmer |
| 7,172,787 | B2 | 2/2007 | Torigoe et al. |
| 7,188,416 | B1 | 3/2007 | Woehlke et al. |
| 7,415,958 | B2 | 8/2008 | Boehm et al. |
| 7,533,657 | B2 | 5/2009 | Onodera |
| 7,568,273 | B2 | 8/2009 | Iizumi et al. |
| 7,607,209 | B2 | 10/2009 | Iizumi et al. |
| 7,758,910 | B2 | 7/2010 | Moreau et al. |
| 7,851,046 | B2 | 12/2010 | Nishimura et al. |
| 7,862,404 | B2 | 1/2011 | Takashima et al. |
| 7,982,435 | B2 | 7/2011 | Masuda |
| 8,103,485 | B2 | 1/2012 | Plett |
| 8,209,831 | B2 | 7/2012 | Boehm et al. |
| 2003/0052650 | A1 | 3/2003 | Gunji |
| 2004/0079556 | A1 | 4/2004 | Cramer et al. |
| 2005/0064146 | A1 | 3/2005 | Hollis et al. |
| 2005/0137829 | A1 | 6/2005 | Gimelfarb et al. |
| 2006/0021809 | A1 | 2/2006 | Xu et al. |
| 2006/0100833 | A1 | 5/2006 | Plett |
| 2007/0000129 | A1 * | 1/2007 | Hahn et al. ............... 29/888.011 |
| 2007/0012177 | A1 | 1/2007 | Miyamoto et al. |
| 2008/0244891 | A1 | 10/2008 | Iizumi et al. |
| 2008/0245226 | A1 | 10/2008 | Iizumi et al. |
| 2008/0252412 | A1 | 10/2008 | Larsson et al. |
| 2008/0260958 | A1 | 10/2008 | Sekikawa et al. |
| 2009/0031564 | A1 | 2/2009 | Meier |
| 2009/0058366 | A1 | 3/2009 | Masuda |
| 2010/0031799 | A1 | 2/2010 | Ast et al. |
| 2010/0101526 | A1 | 4/2010 | Schaefer et al. |
| 2010/0139607 | A1 | 6/2010 | Herbst-Dedrichs et al. |
| 2011/0000085 | A1 | 1/2011 | Kanai et al. |
| 2011/0023777 | A1 | 2/2011 | Mishimura et al. |
| 2011/0030663 | A1 * | 2/2011 | Verpoort et al. ............... 123/668 |
| 2011/0297118 | A1 | 12/2011 | Izawa et al. |
| 2012/0018407 | A1 | 1/2012 | Schramm et al. |

FOREIGN PATENT DOCUMENTS

| | | |
|---|---|---|
| DE | 4447514 A1 | 2/1996 |
| DE | 19919024 | 11/2000 |
| DE | 60131096 | 2/2008 |
| DE | 102006045275 | 2/2008 |
| DE | 102006057641 A1 | 6/2008 |
| DE | 102008022225 | 11/2009 |
| DE | 102008024313 | 12/2009 |
| DE | 102008058452 | 2/2010 |
| DE | 102009008741 | 8/2010 |
| DE | 1020100141689 | 10/2011 |
| EP | 0716158 | 6/1996 |
| EP | 0903422 | 3/1999 |
| EP | 0919715 | 6/1999 |
| EP | 1504833 | 2/2005 |
| EP | 1559807 | 8/2005 |
| EP | 1559807 A1 | 8/2005 |
| EP | 1854903 | 11/2007 |
| EP | 1967601 A2 | 9/2008 |
| JP | 2001245457 | 9/2001 |
| JP | 2001246352 | 9/2001 |
| JP | 2005336556 | 12/2005 |
| JP | 2006097045 | 4/2006 |
| JP | 2006097046 | 4/2006 |
| JP | 2007277607 | 10/2007 |
| JP | 2008111582 | 5/2008 |
| JP | 2010209454 A | 9/2010 |
| JP | 2010275898 | 12/2010 |
| RU | 2297314 | 4/2007 |
| SU | 1310181 | 5/1987 |
| WO | 0037789 | 6/2000 |
| WO | 2005040446 | 5/2005 |
| WO | 2005273425 | 8/2005 |
| WO | 2006061710 | 6/2006 |
| WO | 2007007821 | 1/2007 |
| WO | 2007087989 | 8/2007 |
| WO | 2008034419 | 3/2008 |
| WO | 2010015229 | 2/2010 |
| WO | 2011161346 | 12/2011 |

OTHER PUBLICATIONS

Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland, Apr. 2008.

Journal of Thermal Spray Technology, JTTEE5 16: 181-182, In The News, Conference and Workshop Information, vol. 16(2) Jun. 2007.

European Patent Office, European Search Report for the corresponding EP Application No. 10167055.2 mailed Oct. 11, 2011.

International Patent Bureau, International Search Report for the corresponding German Patent Application No. DE 10 2008 019 933.8 filed Apr. 21, 2008 and the PCT/EP2009/054670 filed Apr. 20, 2009.

German Search Report dated Mar. 8, 2010, pp. 1-2.

Non-final Office Action dated Dec. 12, 2013 for U.S. Appl. No. 13/538,151, filed Jun. 29, 2012.

Non-final Office Action dated Dec. 4, 2013 for U.S. Appl. No. 13/752,572, filed Jan. 29, 2013.

Eberhard Kretzschmar, The Metal Spraying Process and its Application in our history, Veb Carl Marhold Publishing House, Halle (Salle), 1953.

C. Verporrt, W. Blume, R Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany.

Applicants' Statement of Relevance in Accordance With 37 C.F.R. 1.98(a)(3)(i) for IDS Reference JP 2001-245457.

Japanese Patent Office, Japanese Office Action for Japanese Patent Application No. 2010-139542.

* cited by examiner

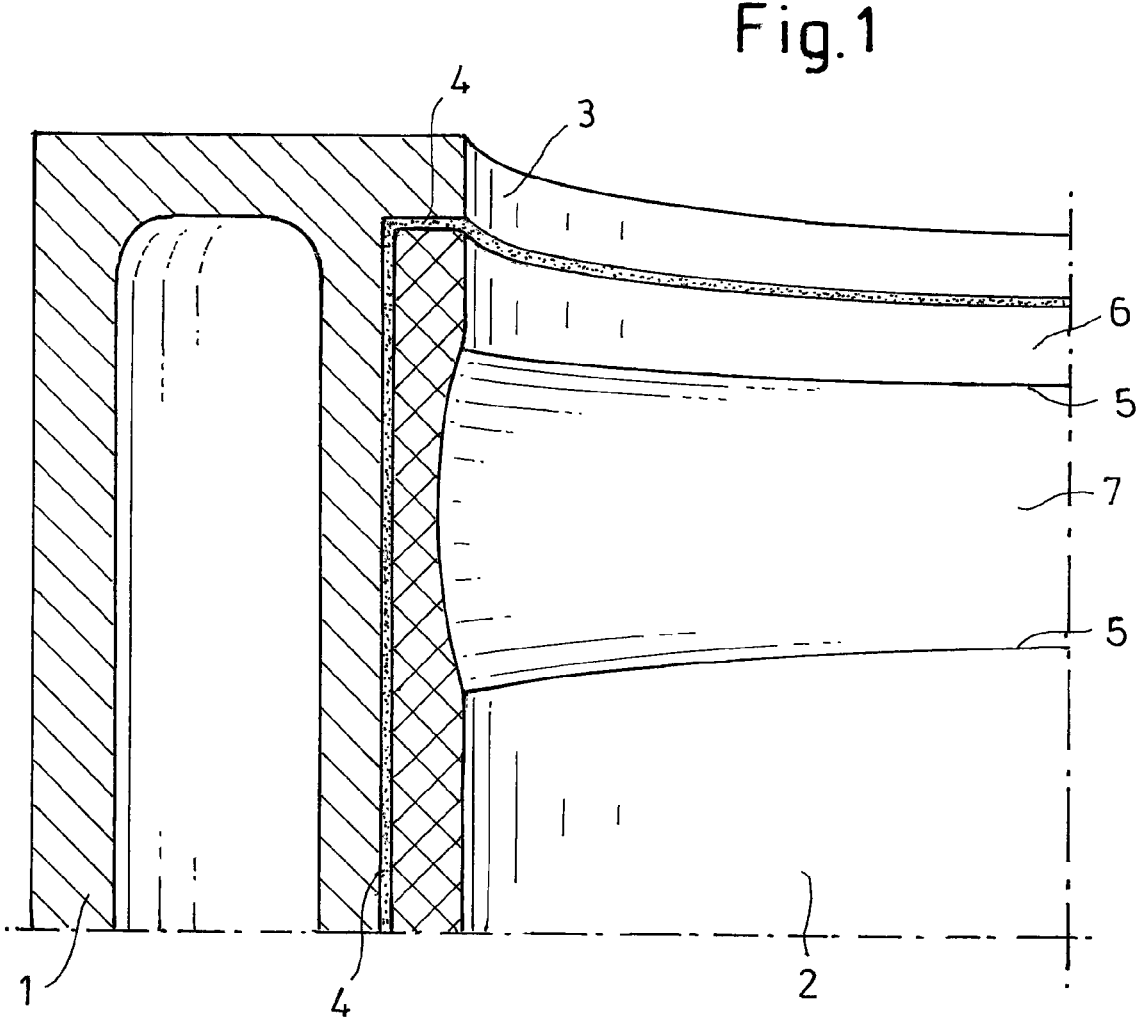

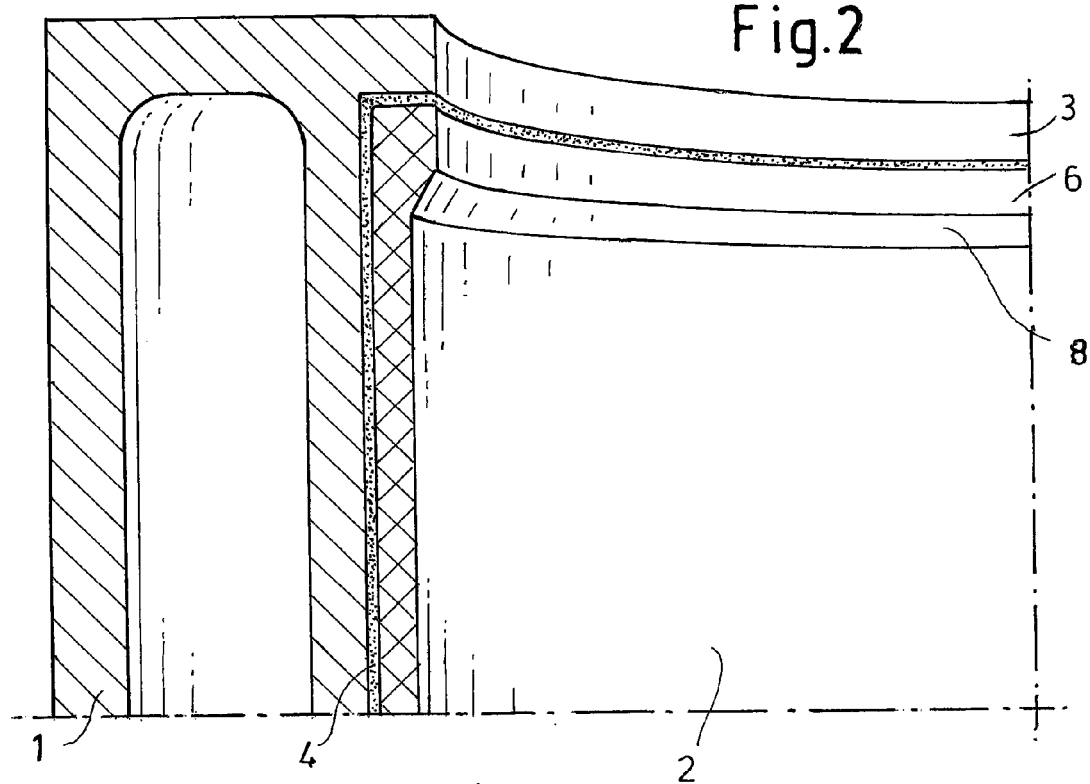
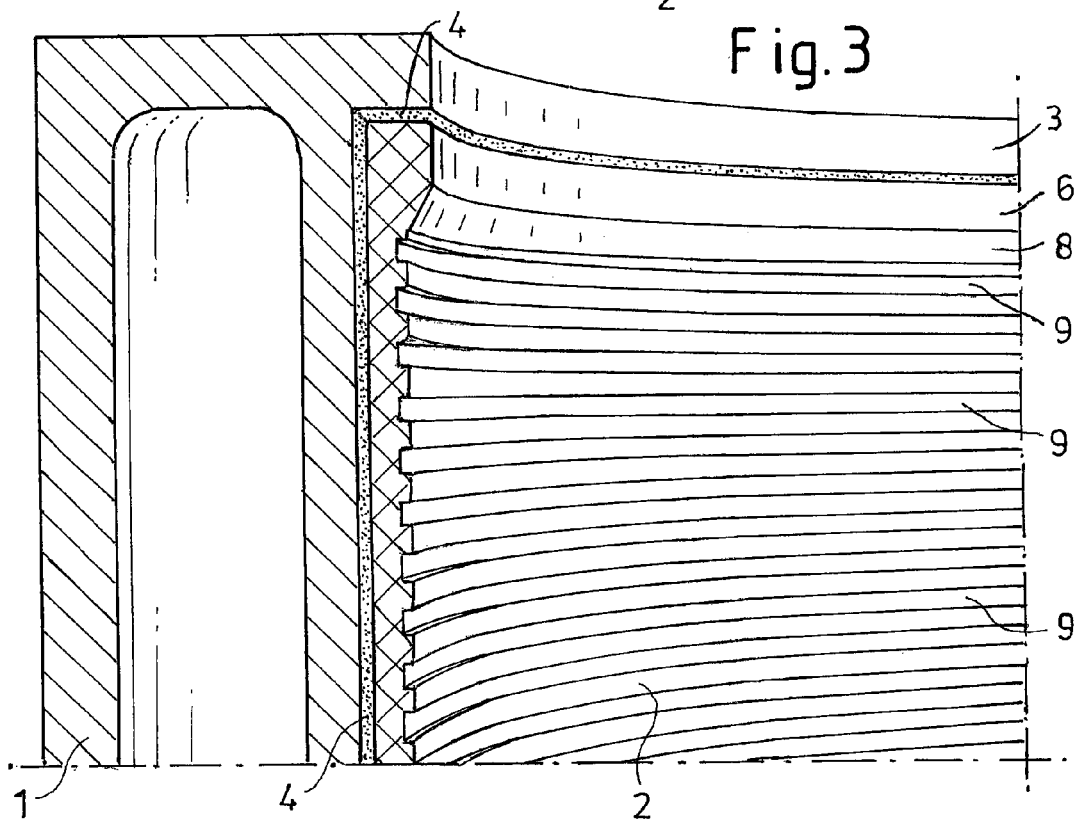

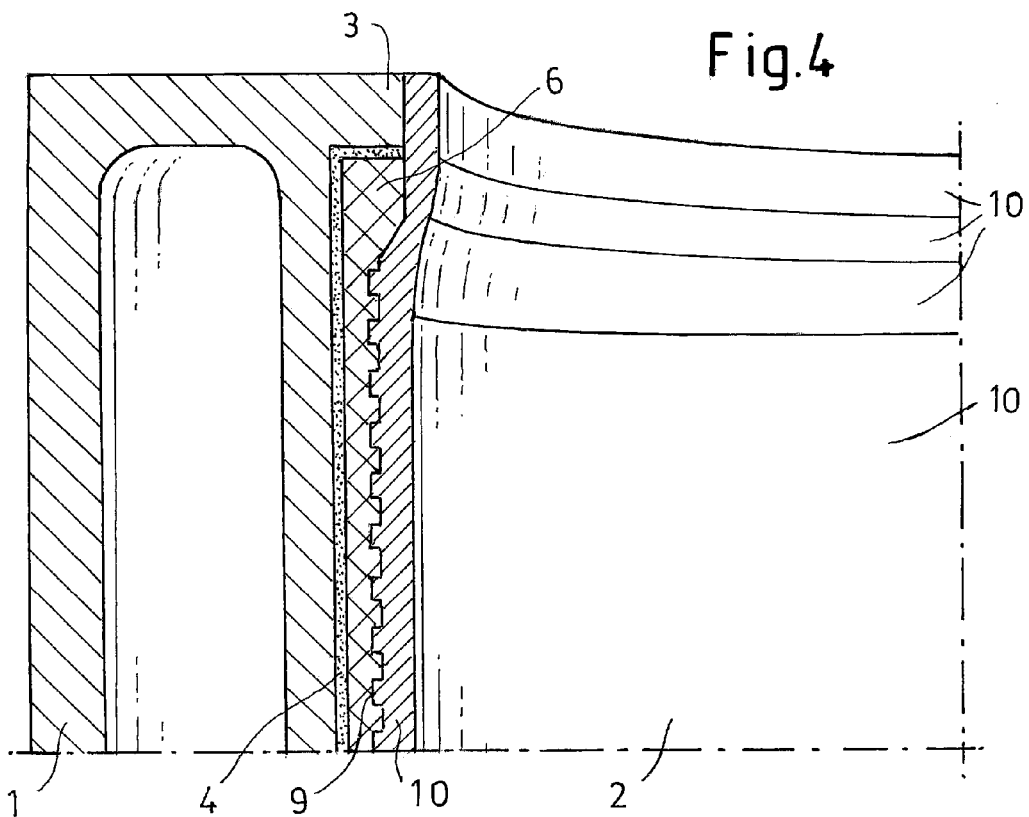
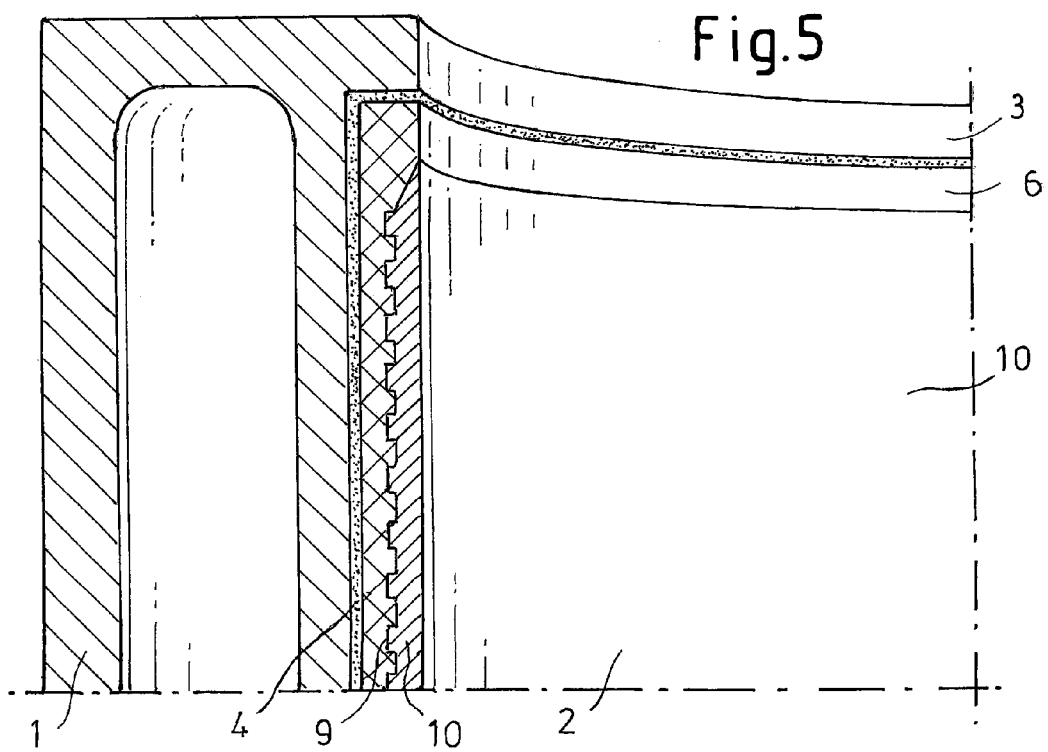

PROCESS FOR REPAIRING A CYLINDER RUNNING SURFACE BY MEANS OF PLASMA SPRAYING PROCESSES

CROSS-REFERENCE TO RELATED APPLICATIONS

This application claims foreign priority benefits under 35 U.S.C. §119(a)-(d) to DE 10 2011 086 803.8, filed Nov. 22, 2011, which is hereby incorporated by reference in its entirety.

TECHNICAL FIELD

The present invention relates to a process for repairing worn cylinder liners of internal combustion engines using a plasma spraying process.

BACKGROUND

It is known to coat the cylinder bearing surface of a cast-aluminum engine block with an iron alloy by carrying out arc wire spraying. Known arc wire spraying processes include twin-wire arc spray (TWAS) process, in which two wires are fed to a spray head in such a manner that the electric current is transmitted across the wires.

Coatings may also be applied by means of plasma spraying, in which a metal powder or a filler wire are melted and nitrogen is fed to the material mixture by means of metallic nitrogen compounds in order to harden the coating.

Present-day internal combustion engines and the engine blocks thereof can be cast from a metal or light metal, e.g. aluminum, aluminum blocks in particular having an iron or metal coating on the cylinder bores thereof. The metal coating can be sprayed on by thermal processes. The processes mentioned above are known as thermal spraying processes. It is advantageous to coat the cylinder bores by means of the plasma spraying process because it is thus possible to produce a coating which has a positive effect on a reduced wear factor and on an increased service life of the engine combined with a relatively low oil consumption as compared with conventional linings provided by means of gray cast iron alloys.

Nevertheless, present-day engine blocks, which are produced for example from a light metal, still have linings made of cast iron metal alloys, for example made of a gray cast iron, such that for example considerable wear arises, for example in the top dead center region but also in other regions of the cylinder liner. If such wear arises, an attempt might be made to provide for repair measures, or to replace the damaged cylinder block; this is not only very costly, but can also have a disadvantageous effect on the entire drive train, since replacement components may not immediately harmonize with existing components and, in certain circumstances, protracted setting work is required.

US Patent Application US2011030663A1 teaches that effective and economical repair by means of thermal spraying may be complicated owing to the aluminum lip which abuts the axial end of the cylinder liner and owing to the region between the aluminum lip and the surface region on the cylinder liner to be coated. US2011030663A1 furthermore discloses that only the worn region of the cylinder running surface is machined with the hammer or percussion brush, in which case the adjacent regions would not be damaged or machined and would remain in the, for example, honed state. Regions comprising different materials are thus produced in the cylinder liner and make uniform machining more difficult.

SUMMARY

In an embodiment disclosed herein, a method of repairing a damaged region of a cylinder liner comprises machining the damaged region to produce a reduced-thickness region, roughening a surface of the reduced-thickness region, applying a coating to the reduced-thickness region and to an un-machined region adjacent to the reduced-thickness region, and finish-machining the coating to produce a desired internal diameter, the coating being substantially completely removed from the un-machined surface.

The coating may further extend axially beyond the un-machined region to coat a lip of an engine block immediately adjacent to an axial end of the liner.

The coating may be applied by a plasma spraying process, such as a plasma transfer wire arc coating process.

The machining step may produce an angled or chamfered transition between the reduced-thickness region and the un-machined region.

The roughening step may comprise a hammer brushing process.

The finish-machining step may comprise honing.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIG. 1 is a fragmentary view of engine block made of a light metal in which a cylinder liner has been cast, the cylinder liner having wear in the top dead center region, and FIGS. 2 to 5 show sequential stages in a process for repairing the cylinder liner.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a fragmentary portion of an engine block 1 which may be made of a light-weight metal such as aluminum alloy. Cylinder liners 2 made of a different metallic material, for example made of gray cast iron, have been cast into the engine block 1, as is well known in the art. The cylinder liner 2 is spanned by a light metal lip 3 (which is part of the engine block 1) on the head side, i.e. at the top in the plane of the drawing. Oil is captured between the cylinder liner 2 and the light metal block 1, as is indicated by means of the channel-like configuration 4. A piston, not shown, is accommodated in a conventional way in the cylinder liner 2.

FIG. 1 shows a portion of the engine block including a portion of an axial end of a cylinder bore, in which the cylinder liner 2 comprises a top dead center region 5 and a head region 6 disposed above the top dead center region. The cylinder liner 2 extends downward along the axial length of the cylinder bore as far as a foot region of the cylinder, which is not shown in the drawing.

The cylinder liner 2 exhibits wear 7, by way of example, in the top dead center region 5. The head region 6 exhibits little or no wear and so is not in need of repair.

In a first step of a repair process, as shown in FIG. 2, the material thickness of the cylinder liner 2 is reduced my removing material from the inside of cylinder liner 2 around the full circumference thereof and preferably from the top dead center region 5, and also encroaching partially into the head region 6, and as far downward as the foot region (not shown). In this case, it is expedient for the material thickness of the head region 6 immediately adjacent to (in the axial direction) the worn or damaged top dead center region 5 to remain partially unchanged. The light metal lip 3 may also remain un-machined in the step, as shown in FIG. 2. That is, the original internal diameter of the light metal lip 3 and of the head region 6 of the liner immediately axially adjacent thereto remains unchanged by the machining step.

The material removal step may be performed so as to form a transition 8 between the top dead center region 5 (in which material is removed) and the head region 6 where no material is removed. Transition 8 may take the form of an incline or internal chamfer, for example, preferably having a continuous inclination in the form of an inclined plane. The transition 8 can also be formed with an outwardly pointing curvature, virtually in the form of a hollow.

It is advantageous that not the entire thickness of cylinder liner 2 is removed during the machining step, but rather a bearing lining structure remains, in order to bear the repair coating which is to be applied in the manner described hereinbelow.

In a subsequent step, the reduced-thickness region of the liner, i.e. from the top dead center region 5 downward as far as the foot region, is roughened. The transition 8 may also be roughened in the process.

Roughening, as used in the present disclosure, is defined as machining in order to roughen the surface in preparation for application of a repair coating. To this end, in the repair process disclosed herein, use is preferably made of the combined hammer brushing process, using a hammer brush or percussion brush. Grooves 9 are thus produced in the cylinder liner 2. The grooves 9 can also have undercuts. Roughening may be achieved, for example, by means of a combined hammer brushing process such as that disclosed in US2011030663A1, the disclosure of which is incorporated herein by reference.

Once the surface has been roughened, the repair coating 10 is applied in a subsequent step, as shown in FIG. 4. To this end, it is possible to use a thermal spraying process, e.g. plasma spraying, by way of example a PTWA internal coating process.

The repair coating 10 is sprayed on with an excess thickness, where excess thickness in this case means that the repair coating 10 is initially applied in a greater thickness than is desired in the completed, repaired liner. When the coating 10 is sprayed on, the head region 6, the channel 4 and the light metal lip 3 are also coated. Since some or all of the surfaces of the head region 6, the channel 4 and the light metal lip 3 have not been roughened, an insufficient bond will be formed in these un-roughened areas. The overspraying of the oil-carrying channel 4, too, does not cause further harm since the repair coating 10 is removed anyway, as shown in FIG. 5 relating to the subsequent step. In the roughened region of the cylinder liner 2, the bond between the repair coating 10 and the roughened region is clearly identifiable.

Between the cylinder liner, which usually consists of a gray cast iron, and the light metal of the engine block, an oil volume, albeit a small oil volume, is captured in a gap between both components, such that it is impractical to carry out a repair by way of a conventional procedure by means of known plasma spraying or plasma transfer wire arc (PTWA) internal coating processes, since the captured oil will issue from the gap on account of the action of the plasma flame, and therefore properties which are required for the bonding of the coating which is sprayed on to the base material are no longer ensured. The coating would therefore be more likely to fail at the boundary between the light metal block and the metallic liner.

Once the repair coating 10 has been applied to the excess thickness, it is finish-machined, in which case, as shown in FIG. 5, the original, desired internal diameter of the cylinder liner 2 is restored. In particular, the coating adhering to the head region 6, bridging the channel 4 and adhering to the light metal lip 3 is substantially completely removed. The term "substantially completely removed" is intended to mean that although some small trace or remnant of the coating may remain, the original diameter of the head region 6 and lip 3 is not significantly decreased. In this respect, the initial coating of these regions also caused no harm, even though oil, for example, would have reduced the bond. The finish-machined repair coating 10 thus adjoins the head region 6 in a flush manner.

The finish-machining step may comprise honing, for example. Since the repair coating is continuous from the transition 8 as far as the foot region, material transitions to different materials are also avoided in the repaired cylinder liner, such that a simple finish-machining tool or honing tool can be used instead of a special honing tool It is noted that the term "finish-machining" as used in this context does not necessarily imply that no further smoothing, polishing, or other treatment of the liner surface will be carried out. Rather, the term refers to the machining step that produces the nominal internal diameter of the cylinder liner.

Although material losses which would be avoidable are therefore to be expected, such a procedure is advantageous in terms of economy of machining, since the spraying tool can be operated in a continuous pass without regard to transition points. Since no regard is paid to transition points, a considerable gain in time which more than compensates for the disadvantage of material loss is made. It is also advantageous that a permanently unchanged original internal diameter of the cylinder liner can thus be produced, without it being necessary in turn to pay regard to (material) transitions.

The repair coating produced on the cylinder liner by way of the disclosed repair process may have the same properties as a coating which has been sprayed from the outset onto a light metal wall in order to thereby form the cylinder liner. In this respect, with the disclosed repair process, it is possible for a cylinder liner originally produced from gray cast iron to have the advantages of a coating applied by, for example, a PTWA internal coating process, while retaining the fundamental gray cast iron lining.

It is of course possible for all cylinder liners of the engine block to be processed by the repair process according to the invention. It is also possible to process wear-free cylinder liners of the engine block, which is to be processed anyway, by the repair process according to the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of repairing a cylinder liner comprising:
machining the liner to produce a reduced-thickness region extending above a damaged top-dead-center region and into an undamaged head region above the top-dead-center region, but stopping short of a lip of the engine block adjacent to an upper end of the liner to leave an un-machined region of the liner at the upper end thereof;
roughening a surface of the reduced-thickness region;
applying a coating to cover the reduced-thickness region, the un-machined region, and at least a portion of the lip; and
finish-machining the coating to produce a desired internal diameter, the coating being substantially completely removed from a transition between the un-machined region and the lip.

2. The method of claim 1, wherein the step of applying the coating comprises a plasma spraying process.

3. The method of claim 2, wherein the plasma spraying process comprises a plasma transfer wire arc coating process.

4. The method of claim 1, wherein the machining step produces an inclined plane between the reduced-thickness region and the un-machined region.

5. The method of claim 1, wherein the roughening step comprises a hammer brushing process.

6. The method of claim 1, wherein the finish-machining step comprises honing.

7. A method of repairing a damaged region of a cylinder liner housed in an engine block comprising:
machining the cylinder liner to produce a reduced-thickness region extending above the damaged region but stopping short of an upper end of the liner adjacent to a lip of the engine block to leave an un-machined region of the liner adjacent to the upper end;
roughening a surface the reduced-thickness region;
applying a coating to the reduced-thickness region, the coating extending onto the un-machined region of the liner; and
finish-machining the coating to produce a desired internal diameter equal to a diameter of the un-machined region prior to the application of the coating, such that the coating is substantially completely removed from a transition between the upper end of the liner and the lip.

8. The method of claim 7, wherein the application of the coating further extends axially onto the lip of the engine block, and the finish-machining substantially completely removes the coating from the lip.

9. The method of claim 7, wherein the coating is applied by a plasma transfer wire arc coating process.

10. The method of claim 7, wherein the machining step produces an inclined plane between the reduced-thickness region and the un-machined region.

11. The method of claim 7, wherein the roughening step comprises a hammer brushing process.

12. The method of claim 7, wherein the finish-machining step comprises honing.

13. A method of repairing an inner surface of a cylinder liner housed in an engine block comprising:
removing material from the inner surface to produce a reduced-thickness region extending axially relative to the cylinder and stopping short of an upper end of the liner adjacent to a lip of the engine block to leave a region of original diameter between the reduced thickness region and the upper end of the liner;
roughening a surface of the reduced-thickness region;
applying a coating to the reduced-thickness region and to at least a portion of the region of original diameter; and
finish-machining the coating to produce a uniform internal diameter equal to an original internal diameter of the region of original diameter prior to the application of the coating, such that the coating is substantially completely removed from a transition between the upper end of the liner and the lip.

14. The method of claim 13, wherein the application of the coating further extends axially onto the lip of the engine block, and the finish-machining substantially completely removes the coating from the lip.

15. The method of claim 13, wherein the coating is applied by a plasma transfer wire arc coating process.

16. The method of claim 13, wherein the roughening step comprises a hammer brushing process.

17. The method of claim 13, wherein the finish-machining step comprises honing.

* * * * *